United States Patent
Breault et al.

(10) Patent No.: US 6,699,612 B2
(45) Date of Patent: Mar. 2, 2004

(54) FUEL CELL POWER PLANT HAVING A REDUCED FREE WATER VOLUME

(75) Inventors: Richard D. Breault, North Kingstown, RI (US); Leslie L. Van Dine, Manchester, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 232 days.

(21) Appl. No.: 10/034,739

(22) Filed: Dec. 26, 2001

(65) Prior Publication Data

US 2003/0118883 A1 Jun. 26, 2003

(51) Int. Cl.[7] .............................................. H01M 08/04
(52) U.S. Cl. ............................ 429/26; 429/13; 429/34
(58) Field of Search ............................... 429/13, 26, 34

(56) References Cited

U.S. PATENT DOCUMENTS

| | | | |
|---|---|---|---|
| 3,801,372 A | * | 4/1974 | Shaw .......................... 429/13 |
| 5,700,595 A | | 12/1997 | Reiser |
| 5,853,909 A | | 12/1998 | Reiser |
| 6,007,931 A | | 12/1999 | Fuller et al. |
| 6,013,385 A | * | 1/2000 | DuBose ........................ 429/17 |
| 6,274,259 B1 | | 8/2001 | Grasso et al. |
| 6,316,135 B1 | * | 11/2001 | Breault et al. ................. 429/22 |

* cited by examiner

Primary Examiner—Carol Chaney
(74) Attorney, Agent, or Firm—Malcolm J. Chisholm, Jr.

(57) ABSTRACT

The invention reduces free water volume in a fuel cell power plant so support systems of the plant are freeze tolerant. The fuel cell power plant includes a coolant system having a sealed cooler plate that circulates an antifreeze coolant in heat exchange with a fuel cell and that collects fuel cell water; a water vapor removal system that removes water vapor from the antifreeze coolant to regulate the antifreeze concentration; and a start-up system having a start-up heat exchanger and a start-up valve that selectively direct heated antifreeze coolant into the cooler plate for a start-up procedure. The plant may also include a fuel processing system that utilizes the removed water vapor, and that is in heat exchange with the start-up heat exchanger. The antifreeze coolant is a low vapor pressure solution, such as an alkanetriol or polyethylene glycol.

23 Claims, 5 Drawing Sheets

FUEL CELL POWER PLANT HAVING A REDUCED FREE WATER VOLUME

TECHNICAL FIELD

The present invention relates to fuel cell power plants that are suited for usage in transportation vehicles, portable power plants, or as stationary power plants, and the invention especially relates to a fuel cell power plant that minimizes free water within one or more fuel cells of the plant and eliminates free water within support systems of the plant so that the plant is freeze tolerant during shut down, start-up and steady-state operation in below freezing ambient temperatures.

BACKGROUND OF THE INVENTION

Fuel cell power plants are well-known and are commonly used to produce electrical energy from reducing fluid and process oxidant reactant streams to power electrical apparatus such as apparatus on-board space vehicles. In such power plants, a plurality of planar fuel cells are typically arranged in a stack surrounded by an electrically insulating frame structure that defines manifolds for directing flow of reducing, oxidant, coolant and product fluids. Each individual cell generally includes an anode electrode and a cathode electrode separated by an electrolyte. A reducing fluid such as hydrogen is supplied to the anode electrode, and an oxidant such as oxygen or air is supplied to the cathode electrode. In a cell utilizing a proton exchange membrane ("PEM") as the electrolyte, the hydrogen electrochemically reacts at a surface of the anode electrode to produce hydrogen ions and electrons. The electrons are conducted to an external load circuit and then returned to the cathode electrode, while the hydrogen ions transfer through the electrolyte to the cathode electrode, where they react with the oxidant and electrons to produce water and release thermal energy.

While having important advantages, PEM cells are also known to have significant limitations especially related to liquid water transport to, through and away from the PEM. Use of such PEM fuel cell power plants to power a transportation vehicle gives rise to additional problems associated with water management, such as preventing mechanical damage when the fuel cell generated water and/or any water coolant fluid freezes, and rapidly melting any frozen water during start-up after the fuel-cell powered vehicle has been shut down in sub-freezing conditions.

Accordingly there is a need for a fuel cell power plant that may be shut down in sub-freezing conditions, that does not sustain mechanical damage resulting from freezing, and that may be quickly started up without need to melt substantial quantities of water.

DISCLOSURE OF THE INVENTION

The invention is a fuel cell power plant having a reduced free water volume so that the one or more fuel cells and support systems of the plant are freeze tolerant during shut down, start-up, and steady-state operation of the plant in ambient temperatures below the freezing temperature of water.

The fuel cell power plant includes at least one fuel cell for generating electrical current from reducing fluid and process oxidant reactant streams; a coolant system, including a cooler plate secured in heat exchange relationship with the fuel cell that directs an antifreeze coolant through the cooler plate to remove heat from the fuel cell, a coolant accumulator in fluid communication with the cooler plate that stores the antifreeze coolant, and a coolant circulating line that directs the antifreeze coolant to flow from the coolant accumulator, through a coolant heat exchanger, through the cooler plate and back to the coolant accumulator; a fuel cell water collector in fluid communication between the fuel cell and the coolant accumulator that directs excess water removed from the fuel cell to the coolant accumulator or to a drain; a water vapor transfer system secured in fluid communication with the coolant accumulator that receives the antifreeze coolant from the accumulator and transfers water vapor out of the antifreeze; and, a fuel cell start-up system secured in fluid communication between the coolant accumulator and the fuel cell including a start-up heat exchanger that heats the antifreeze coolant, a start-up valve and a startup line secured between the start-up heat exchanger and the fuel cell for selectively directing the heated antifreeze coolant from the start-up heat exchanger through the cooler plate to heat the fuel cell. In an alternative embodiment, the fuel cell power plant also includes a fuel processing system secured in fluid communication with the water vapor transfer system and with the fuel cell that utilizes the water vapor in processing a hydrocarbon fuel for the fuel cell, wherein the start-up heat exchanger is secured in heat exchange relationship with the fuel processing system.

During operation and upon shut down of the fuel cell power plant, most of the excess water removed from the fuel cell is not cycled through the fuel cell as a coolant, but instead is directed through the fuel cell water collector into the coolant accumulator to mix with the antifreeze coolant, or from the water collector to be discharged to ambient through the drain. Therefore, the coolant system, water vapor transfer system, fuel cell start-up system, and fuel processing system all include the antifreeze coolant so that they have no free water that could freeze and damage the plant during operation and/or plant shut down in ambient conditions that are below the freezing temperature of water. Upon start-up of the plant, any free water within porous components of the fuel cell that might have to be thawed would be heated by the heated antifreeze coolant being directed from the start-up heat exchanger through the start-up valve and line and through the cooler plate. Additionally, any water vapor needed for the fuel processing components upon start-up of the plant in below freezing conditions would be transferred from the liquid antifreeze coolant within the water vapor transfer system into the fuel processing system. Consequently, the fuel cell power plant with a reduced free water volume of the present invention provides for start-up, steady-state operation, and plant shut down in below freezing ambient conditions with no free water within the coolant system, water vapor transfer system, start-up system, or fuel processing system of the plant. The water removed by the water collector may be vented to ambient, may be drained into the coolant accumulator, or may be supplied to a fuel processing system for processing a hydrocarbon fuel into the reducing fluid, depending upon system requirements and environmental considerations.

The antifreeze coolant is a low vapor pressure antifreeze having a partial pressure of the antifreeze above a solution of the antifreeze coolant and water at an operating temperature of the cell that is less than 0.005 mm Hg.

In a preferred embodiment, the fuel cell power plant may also include a burner that receives and combusts an anode exhaust stream passing out of the fuel cell to burn any unused fuel from the fuel cell, and the combusted anode exhaust stream is then directed to a direct mass and heat transfer device secured in mass transfer relationship with the process oxidant stream prior to the oxidant stream entering the fuel cell to transfer water and heat from the combusted anode exhaust stream into the process oxidant stream. In such an embodiment, the start-up heat exchanger may be secured in heat exchange relationship with the burner. In an additional embodiment, the burner may be positioned in heat exchange relationship with the water vapor transfer system to facilitate transfer of water vapor out of the antifreeze coolant. The fuel cell power plant may also be operated so that the antifreeze coolant is maintained at a pressure that is lower than a pressure of the reactant streams to facilitate containment of the antifreeze, and to reduce a possibility that the antifreeze coolant might poison catalysts of the cell. In an alternative embodiment, the fuel cell may include porous water transport plates which may also serve as reactant flow fields of the fuel cell. Water generated by the fuel cell may then be directed through the porous water transport plates into and through the fuel cell water collector to a drain, to the coolant accumulator, or to a fuel processing system. In a further embodiment, the fuel cell may not have any porous water transport plates, and instead, fuel cell water and any water within the reactant streams passes out of the fuel cell as water vapor and entrained water droplets within cathode and anode exhaust streams. In such an embodiment the exhaust streams are directed through the burner to combust un-combusted fuel, and the combusted plant exhaust stream is then directed through an air or water cooled water recovery condenser, and the condensed water is then directed into the coolant accumulator.

Accordingly, it is a general purpose of the present invention to provide a fuel cell power plant having a reduced free water volume that overcomes deficiencies of the prior art.

It is a more specific object to provide a fuel cell power plant having a reduced free water volume that minimizes free water within the fuel cell and reduces free water within support systems of the fuel cell power plant.

It is yet another object to provide a fuel cell power plant having a reduced free water volume during steady-state operation, shut down and start-up of the plant.

It is another object to provide a fuel cell power plant having a reduced free water volume that facilitates a rapid start-up of the power plant after the plant has been shut down in ambient conditions below the freezing temperature of water.

It is a further object to provide a fuel cell power plant having a reduced free water volume that prevents mechanical damage to the plant by freezing of free water during shut down of the power plant in ambient conditions below the freezing temperature of water.

It is yet another object to provide a fuel cell power plant having a reduced free water volume where the water is drained from the fuel cell by gravity.

These and other objects and advantages of the present fuel cell power plant having a reduced free water volume will become more readily apparent when the following description is read in conjunction with the accompanying drawings.

DESCRIPTION OF THE PREFERRED EMBODIMENTS

Figure 1:
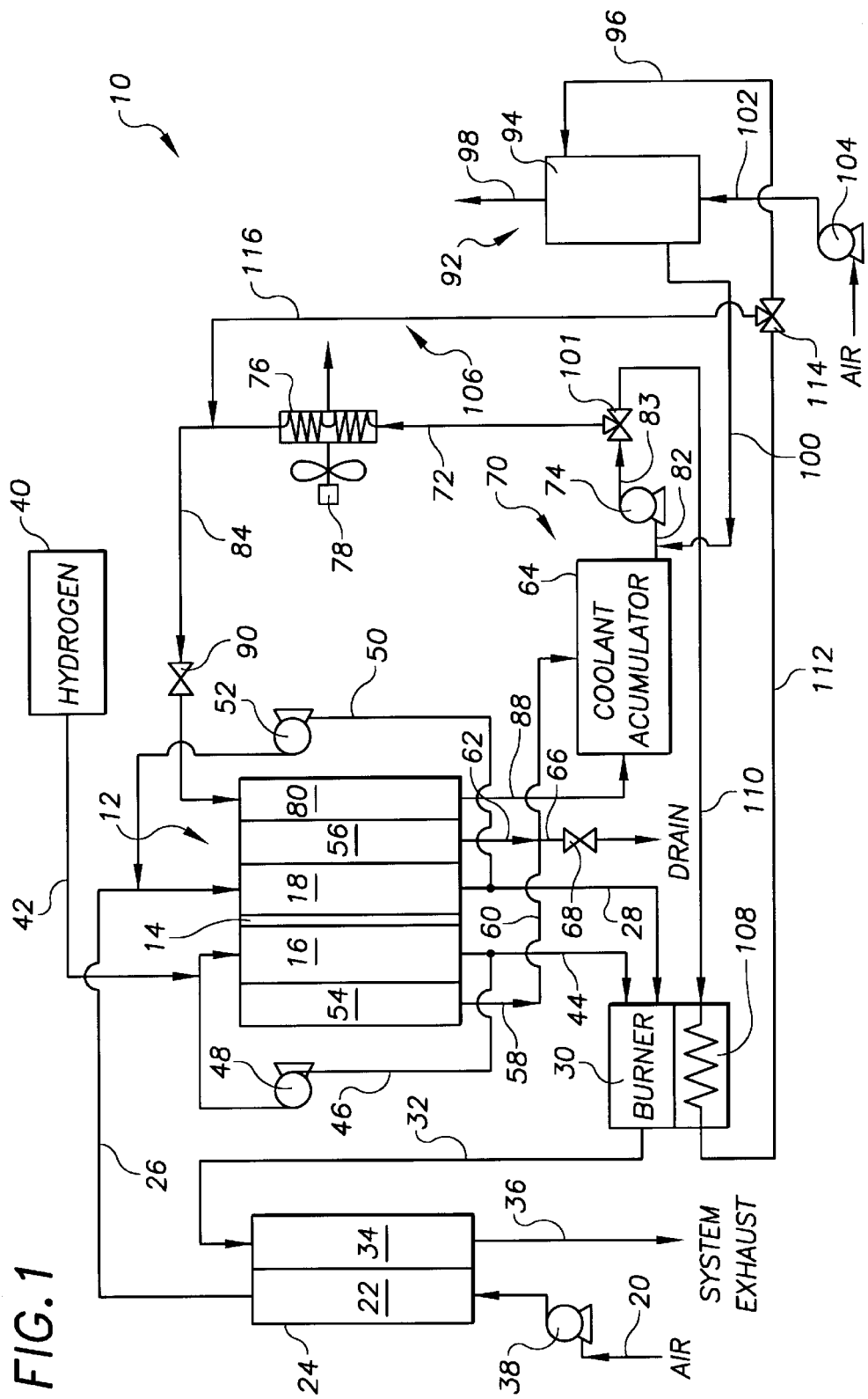
FIG. 1 is a schematic representation of a first embodiment of a fuel cell power plant having a reduced free water volume constructed in accordance with the present invention.

Referring to the drawings in detail, a first embodiment of a fuel cell power plant having a reduced free water volume is shown in FIG. 1, and is generally designated by the reference numeral 10. For purposes herein, it is to be understood that the phrase "free water" is meant to describe water having virtually no antifreeze within the water so that the freezing temperature of the "free water" is not reduced below zero degrees Celsius. The first embodiment of the fuel cell power plant 10 includes a fuel cell 12. The fuel cell 12 includes a membrane electrode assembly 14 (such as an anode catalyst and a cathode catalyst secured to opposed sides of a proton exchange membrane as is known in the art), an anode flow field 16, and a cathode flow field 18 defined on opposed sides of the membrane electrode assembly 14. As is well-known in the art, the fuel cell 12 may be combined with other virtually identical fuel cells (not shown) to form a cell stack assembly including manifolds to direct the reactant streams through the stack. An oxidant supply line 20 directs a process oxidant stream, such as air (as labeled "Air" in FIG. 1), through an inlet chamber 22 of a direct mass and heat transfer device 24 and into an oxidant inlet 26, which in turn directs the oxidant stream into the cathode flow field 18 of the fuel cell 12. A cathode exhaust line 28 directs the oxidant stream as a cathode exhaust stream from the fuel cell 12 into a burner 30, and a plant exhaust line 32 directs the combusted cathode exhaust stream into an exhaust chamber 34 of the direct mass and heat transfer device 24 to pass out of the fuel cell power plant 10 in a system exhaust 36 (labeled "System Exhaust" in FIG. 1). The direct mass and heat transfer device 24 may be of a type described in U.S. Pat. No. 6,274,259 B1 that issued on Aug. 14, 2001 to Grasso et al., which patent is owned by the assignee of all rights in the present invention, and which patent is hereby incorporated herein by reference. An oxidant blower 38 may be positioned on the oxidant supply line 20 to increase pressure of the oxidant stream being directed into the direct mass and heat transfer device 24 and the cathode flow field 18. Alternatively, the oxidant blower may be positioned between the direct heat and mass transfer device 24 and the oxidant inlet 26.

A reducing fluid, such as hydrogen gas, is directed from a fuel supply 40 through a reducing fluid inlet 42 into the anode flow field 16. An anode exhaust line 44 directs the reducing fluid passing out of the anode flow field as an anode exhaust stream into the burner 30 wherein any unused reducing fluid is combusted and then directed into the plant exhaust line 32 with the cathode exhaust stream as a plant exhaust stream, and then into the direct mass and heat transfer device 24. The fuel cell 12 may also include an anode recycle line 46 secured between the anode exhaust line 44 and the reducing fluid inlet 42 and an anode recycle blower 48 secured to the line 46 for selectively recycling a portion of the anode exhaust back into the anode cathode flow field 16. Additionally, the fuel cell may also include a cathode recycle line 50 secured between the cathode exhaust line 28 and the oxidant inlet 26 with a cathode exhaust blower 52 secured to the line 50 to selectively recycle a portion of the cathode exhaust stream back into the cathode flow field 18.

The first embodiment of the fuel cell power plant 10 having a reduced free water volume may also include an anode flow field 16 including a first porous water transport plate defining a first water flow field 54, and may also include a cathode flow field 18 including a second porous water transport plate defining a second water flow field 56, as shown in FIG. 1. Fuel cells containing such water transport plates are described in U.S. Pat. No. 5,503,944, and U.S. Pat. No. 5,700,595, which patents are owned by the assignee of all rights in the present invention, and which patents are hereby incorporated herein by reference. The first and second water flow fields 54, 56 provide a means for removing excess water from the fuel cell 10.

A first fuel cell water drain 58 directs water from the first water flow field 54 into a fuel cell water collector 60, and a second fuel cell water drain 62 directs water from the second water flow field 56 into the fuel cell water collector 60. The fuel cell water collector 60 directs the water from the water flow fields 54, 56 into a coolant accumulator 64 that houses both the fuel cell water delivered from the fuel cell water collector 60 as well as an antifreeze coolant. An excess fuel cell water drain 66 (labeled "drain" in FIG. 1) and water drain valve 68 are also secured to the fuel cell water collector 60 for selectively discharging excess water. The relative amount of water drained into the coolant accumulator 64 from the water collector 60 may be varied with ambient temperature conditions. If the ambient temperature is above freezing, all of the discharge from the water collector 60 may be directed to the water drain 68 and discharged to ambient. Alternatively, if the ambient temperature is below freezing, all of the discharge from the water collector 60 may be directed to the coolant accumulator 64. The fuel cell water collector 60 may be manifolding and/or piping that collects fuel cell water and/or water vapor and entrained water droplets leaving the fuel cell 12 and directs the water into the coolant accumulator 64.

It is to be understood that the first embodiment of the fuel cell power plant 10 having a reduced free water volume may direct water from the fuel cell 12 into the fuel cell water collector 60 and coolant accumulator 64 through apparatus known in the art other than through the first and second water flow fields 54, 56. For example, and as described below with respect to an alternative embodiment, the fuel cell water may simply exit the fuel cell in the cathode and anode exhaust streams as water vapor and entrained water droplets and thereafter condensed in a condenser from which the liquid water is directed into the fuel cell water collector 60 and coolant accumulator 64.

The first embodiment of the fuel cell power plant having a reduced water volume 10 also includes a coolant system 70 having the coolant accumulator 64, a coolant circulating line 72 that directs the antifreeze coolant mixed with the water from the accumulator 64 through a coolant pump 74, through a coolant heat exchanger 76 that may be cooled by a fan 78 (similar to a conventional automobile radiator known in the art), into and through a sealed cooler plate 80 secured in heat exchange relationship with the fuel cell 12, and back into the coolant accumulator 64. By characterizing the cooler plate 80 as being a "sealed cooler plate", it is to be understood that the cooler plate 80 permits the antifreeze coolant to flow through the plate 80, but the plate 80 does not permit any of the antifreeze coolant to flow from the plate 80 into the adjacent fuel cell components, such as into the first or second water flow fields 54, 56, etc.

As shown in FIG. 1, the coolant circulating line 72 may include sub-sections, such as an accumulator discharge line 82 secured between the coolant accumulator and the coolant pump 74; a coolant heat exchanger feed line 83 secured between the coolant pump 74 and the coolant heat exchanger 76; a cooler plate feed line 84 secured between the coolant heat exchanger 76 and the cooler plate 80; and, a cooler plate discharge line 88 secured between the cooler plate 80 and the coolant accumulator 64.

The coolant system 70 may include pressure control means for regulating a pressure of the antifreeze coolant circulating through the coolant system 60 to be less than a pressure of the process oxidant and reducing fluid reactant streams passing through the anode 16 and cathode 18 flow fields, such as a coolant pressure control valve 90 secured to the coolant circulating line 72 between the coolant pump 74 and the cooler plate 80, such as on the cooler plate feed line 84. The coolant pressure control valve 90 may be any valve know in the art that can be coordinated with the coolant pump 74 to restrict flow of the antifreeze coolant flowing through the valve 90 for maintaining a specific pressure of the antifreeze coolant within the cooler plate 80. As is well-known, the coolant pressure control valve 90 may be set manually, automatically, or, for example, may be electro-mechanically adjusted based upon a reference pressure of the process oxidant stream within the cathode flow field 18 and/or of the reducing fluid stream within the anode flow field 16 to restrict flow through the valve 90 so that the stream of antifreeze coolant drawn into the coolant pump 74 from the cooler plate 80 and cooler plate discharge line 88, is at a pressure lower than the pressure of the process oxidant and/or reducing fluid streams within the cathode flow field 18 and anode flow field 16. Additional pressure control means for purposes herein may include any well-known mechanism that can reduce pressure of a liquid stream below a reference pressure of a gaseous stream, such as disclosed in U.S. Pat. No. 5,700,595, issued on Dec. 23, 1997 to Reiser and assigned to the assignee of the present invention, which patent is hereby incorporated herein by reference.

The first embodiment of the fuel cell power plant having a reduced free water volume 10 also includes a water vapor transfer system 92 secured in fluid communication with the coolant accumulator 64 that receives the antifreeze coolant from the accumulator 64 for transferring water vapor out of the antifreeze coolant. By transferring the water vapor out of the antifreeze coolant, the antifreeze coolant may be maintained at an optimal concentration for achieving a desired freezing temperature reduction of the antifreeze coolant. Additionally, the removed water vapor may be utilized by other power plant systems, as described below. The water vapor transfer system 92 includes a water removal means 94 for removing water from the antifreeze coolant; an antifreeze coolant supply line 96 secured between the coolant accumulator 64 and the water removal means 94 that directs the antifreeze coolant to the removal means 94; a water vent 98 that directs separated water out of the water removal means 94; and, an antifreeze coolant return line 100 secured between the water removal means 94 and the coolant system 70, such as at the accumulator discharge line 82 adjacent a suction side of the coolant pump 74. The antifreeze coolant supply line 96 may be secured directly to the coolant accumulator 64, or as shown in FIG. 1, may be secured indirectly in fluid communication with a coolant system diversion valve 101 that is secured to the coolant circulating line 72, such as a standard three-way valve, that selectively directs some of the antifreeze coolant to circulate within the coolant system 70, and directs some of the antifreeze coolant to circulate through the water vapor transfer system 92.

The water removal means 94 may be any of a variety of known apparatus capable of separating water from a solution or mixture of water and the antifreeze coolant. For example, the water removal means 94 may be a contact saturator, such as a packed bed that receives an air supply through a water removal air line 102 and water removal air blower 104 as shown schematically in FIG. 1. Additionally, the water removal means 94 may consist of a burner that heats the antifreeze coolant directly to transfer water vapor out of the antifreeze coolant (not shown in FIG. 1). The water removal means 94 may also consist of a burner utilized in direct heat exchange relationship with a contact saturator, or the water removal means 94 may include a heat exchanger that transfers heat through a fluid, such as heated antifreeze coolant, to a contact saturator to further facilitate removal of the water from the antifreeze coolant.

The first embodiment of the fuel cell power plant having a reduced free water volume 10 also includes a start-up system means 106 for heating the antifreeze coolant and for directing the heated antifreeze coolant to the fuel cell 12. The start-up system 106 is secured in fluid communication between the coolant accumulator 64 and the fuel cell 12. The start-up system includes a start-up heat exchanger 108 secured in heat exchange relationship with the burner 30 for heating the antifreeze coolant; an antifreeze coolant heater line 110 connected between the start-up heat exchanger 108 and the coolant accumulator 64, or the coolant system diversion valve 101 (as shown in FIG. 1) that directs antifreeze coolant to the heat exchanger 108; a start-up line 112 in fluid communication between the start-up heat exchanger 108 and the cooler plate 80 that directs the heated antifreeze coolant to pass through the cooler plate 80; and, a start-up valve 114 secured to the start-up line 112 that may be controlled or selected to direct all of, or some of the heated antifreeze coolant to pass from the start-up line 112 through a first extension 116 of the start-up line 112 into the coolant circulating line 72 of the coolant system 70 down stream of the coolant pump 74, such as shown in FIG. 1 at the cooler plate feed line 84, so that the heated antifreeze may flow through the cooler plate 80 to heat the fuel cell 12 during a start-up procedure after the fuel cell power plant 10 has been shut down in ambient conditions below the freezing temperature of water. For purposes herein, it is to be understood that describing the start-up valve as "selectively directing the heated antifreeze from the start-up heat exchanger through the cooler plate", means that the start-up valve 114 may be controlled through manual, mechanical or other controllers known in the art to direct all or a portion of the heated antifreeze coolant for a desired period of time to flow through the cooler plate 80 to heat the fuel cell 12.

As is apparent from FIG. 1, if the start-up valve 114 is not directing the heated antifreeze coolant into the coolant system 70 to heat the fuel cell, the start-up valve 114 (such as a standard three-way valve) then directs the heated antifreeze coolant into the water vapor transfer system 92, such as into the water removal means 94 through the antifreeze coolant supply line 96. It is anticipated that the start-up valve 114 may direct a portion of the heated antifreeze coolant to both the coolant system 70 and the water vapor transfer system 92 under certain operating conditions. The start-up heat exchanger 108 may be eliminated and the heated antifreeze solution from the cooler plate 80 may pass from the cooler plate discharge line 88 to the coolant accumulator 64 to the water removal means 94 by way of the coolant pump 74, the start-up line 112, and the start-up valve 114.

In use of the first embodiment of the fuel cell power plant having a reduced free water volume 10, after the heated antifreeze coolant has passed through the coolant system 70 to thaw any frozen water within the fuel cell 12, the start-up valve 114 then selectively directs the heated antifreeze coolant to flow into and through the water vapor transfer system 92 during a steady-state operation of the power plant 10 so that a portion of fuel cell water mixed with the antifreeze coolant within the coolant accumulator 64 may be removed to maintain the antifreeze coolant concentration at a desired level for optimal freeze protection of the power plant 10. As ambient conditions change, excess fuel cell water may accumulate and be drained out of the plant 10 through the water drain 66.

The antifreeze coolant is a low vapor pressure antifreeze having a partial pressure of the antifreeze above a solution of the antifreeze coolant and water at an operating temperature of the cell that is less than 0.005 mm Hg. An exemplary antifreeze coolant is selected from the group consisting of an alkanetriol solution and polyethylene glycol. A further exemplary antifreeze coolant is selected from the group consisting of glycerol, butanetriol, pentanetriol, polyethylene glycol, and mixtures thereof.

Figure 2:
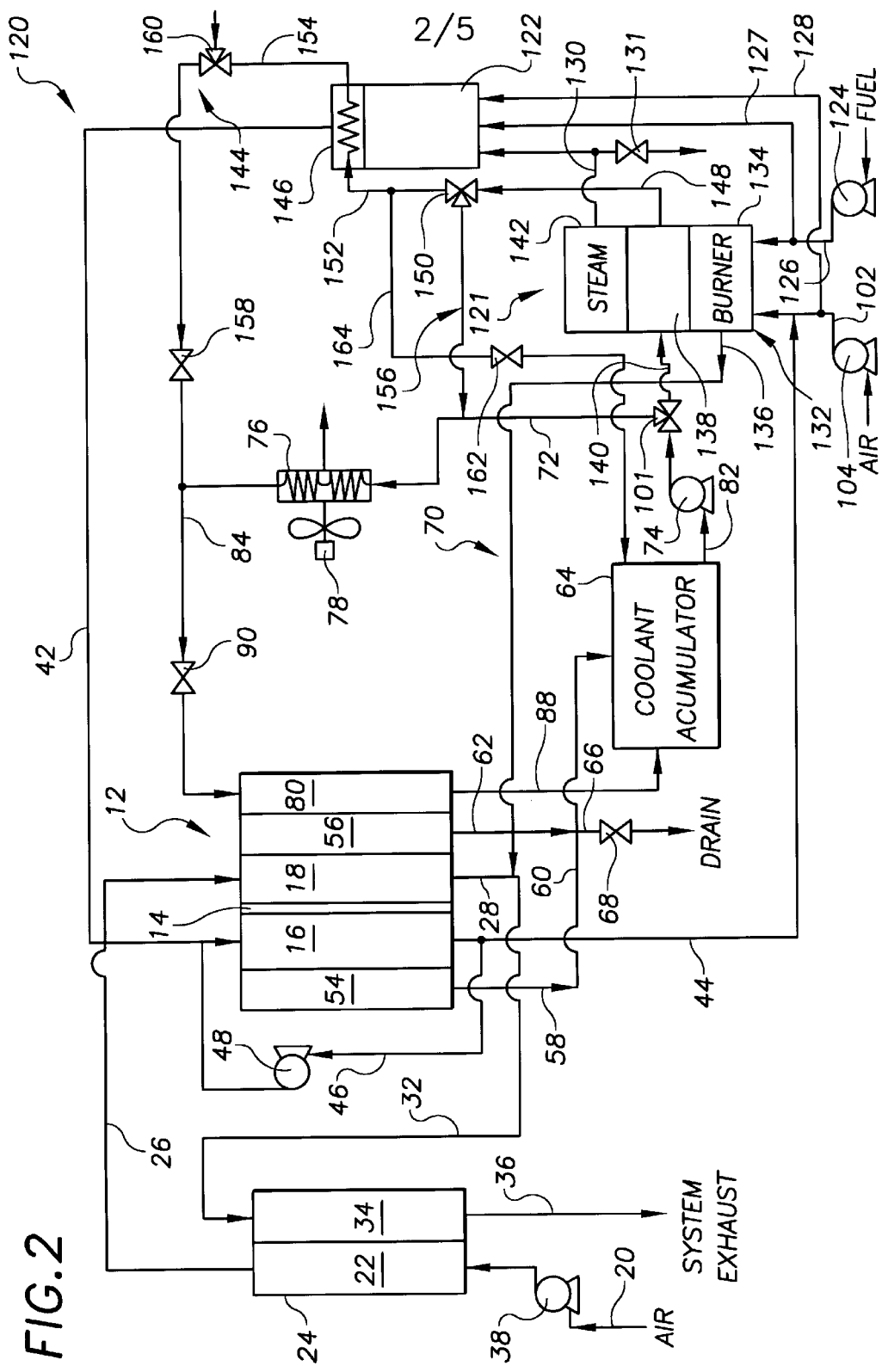
FIG. 2 is a schematic representation of a second embodiment of a fuel cell power plant having a reduced free water volume.

A second embodiment of the fuel cell power plant having a reduced free water volume is shown in FIG. 2 and is generally designated by the reference numeral 120. For purposes of efficiency, those components of the second embodiment of the fuel cell power plant 120 that are identical to the components of the first embodiment 10 are identified with the same reference numerals in FIG. 2 as they are in FIG. 1. The second embodiment of the fuel cell power plant 120 includes a fuel processing system 122 for converting a hydrocarbon fuel into a reducing fluid fuel appropriate for a fuel cell, such as disclosed as a "fuel processing component means" in the aforesaid U.S. Pat. No. 6,274,259 B1, as well as in U.S. Pat. No. 6,007,931 that issued on Dec. 28, 1999 to Fuller et al., which patent is owned by the assignee of all rights in the present invention, and which patent is hereby incorporated herein by reference. As is well known in the art, the fuel processing means, which in this illustration includes an autothermal reformer, receives a hydrocarbon fuel, such as gasoline, etc., from a fuel pump 124 and fuel feed line 126 and first extension 127 thereof, and also receives an air supply from a fuel processing extension 128 of the water removal air supply line 102. The fuel processing system also receives water vapor in the form of steam that is transferred from a second water vapor transfer system 121 through a water vapor feed line 130. Excess water vapor may be directed out of the second water vapor transfer system 121 through a water vapor drain 131 secured, for example, to the water vapor feed line 130. As is well known, the fuel processing system processes the hydrocarbon fuel through the application of heat (e.g., such as by a reformer, shift converter, and selective oxidizer known in the art) and water vapor to the fuel into a reducing fluid which is then directed from the fuel processing system 122 into the reducing fluid inlet 42 to be directed into the anode flow field 16 of the fuel cell 12.

In the second embodiment 120 of the fuel cell power plant of the present invention, the second water vapor transfer system 121 includes a second water removal means 132 that has a water removal burner 134 that receives air from the water removal air supply line 102 and blower 104, receives fuel from the fuel feed line 126, and that may also receives the anode exhaust stream directed from the fuel cell 12 within the anode exhaust line 44. The combusted anode exhaust stream passes out of the water removal burner 134 within a combusted anode exhaust line 136 to mix with the cathode exhaust stream to become the plant exhaust stream within the plant exhaust line 32. The water removal burner 134 is secured in heat exchange with a boiler 138 that receives the antifreeze coolant from a second antifreeze coolant supply line 140 secured in fluid communication between the boiler 138 and the coolant accumulator 64 by way of, for example, the coolant system diversion valve 101, as shown if FIG. 2. A steam separator 142 is secured in fluid communication with the boiler 138 that separates the boiled water vapor as steam from the antifreeze coolant heated within the boiler 138, and the steam is directed from the steam separator 142 through the water vapor feed line 130 into the fuel processing system 122 to support fuel processing therein.

Also in the second embodiment of the fuel cell power plant having a reduced free water volume 120, a second start-up system 144 includes a second start-up heat exchanger 146 secured in heat exchange relationship with the fuel processing system 122; a second antifreeze coolant heater line 148 secured in fluid communication with the coolant accumulator 64, such as through the boiler 138, directs the heated antifreeze coolant into a second startup valve 150, and through an extension 152 of the second antifreeze coolant heater line 148 into the second start-up heat exchanger 146; and, a second start-up line 154 secured to the second start-up heat exchanger 146 that directs the heated antifreeze coolant to pass into the cooler plate 80 to heat up the fuel cell 12 during a start-up operation.

The second start-up valve 150 may selectively direct all or a portion of the antifreeze coolant to flow into the second start-up heat exchanger 146, or it may be controlled to direct all or a portion of the antifreeze coolant to flow through a coolant system feed line 156 secured between the second start-up valve and the coolant system 70, for example secured to the coolant circulating line 72. After the fuel cell power plant 120 has reached a steady-state operation, all of the antifreeze coolant leaving the second water vapor transfer system 121 may be directed back into the coolant system 70. In such a state of the power plant 120, in order to avoid degradation of the antifreeze coolant within the second start-up heat exchanger 146, a first drain valve 158 secured to the second start-up line 154 would be controlled to stop any back flow of the antifreeze coolant from the coolant system 70 into the second start-up line 154; a drain vent 160 secured to the start-up line 154 between the first drain valve 158 and the second start-up heat exchange 146 would be controlled to admit air to assist in drainage of the antifreeze coolant; and, a second drain valve 162 secured to a drain line 164 in fluid communication between the second start-up heat exchanger 146 and the coolant accumulator 64 would be controlled to permit drainage of the antifreeze coolant through the second drain valve 162 back into the coolant system 70, such as at the coolant accumulator 64.

The second embodiment of the fuel cell power plant having a reduced free water volume 120 achieves operating efficiencies by integrating the second start-up heat exchanger 146 of the second start-up system 144 with the substantial heat generated by the fuel processing system 122, as well as by utilizing additional heat generated by the water removal burner 134 and boiler 138 in the second water vapor transfer system 121. Additional efficiencies are achieved by combusting the anode exhaust stream within the water removal burner 134 of the second water vapor removal system instead of utilizing a separate combustion apparatus.

Figure 3:
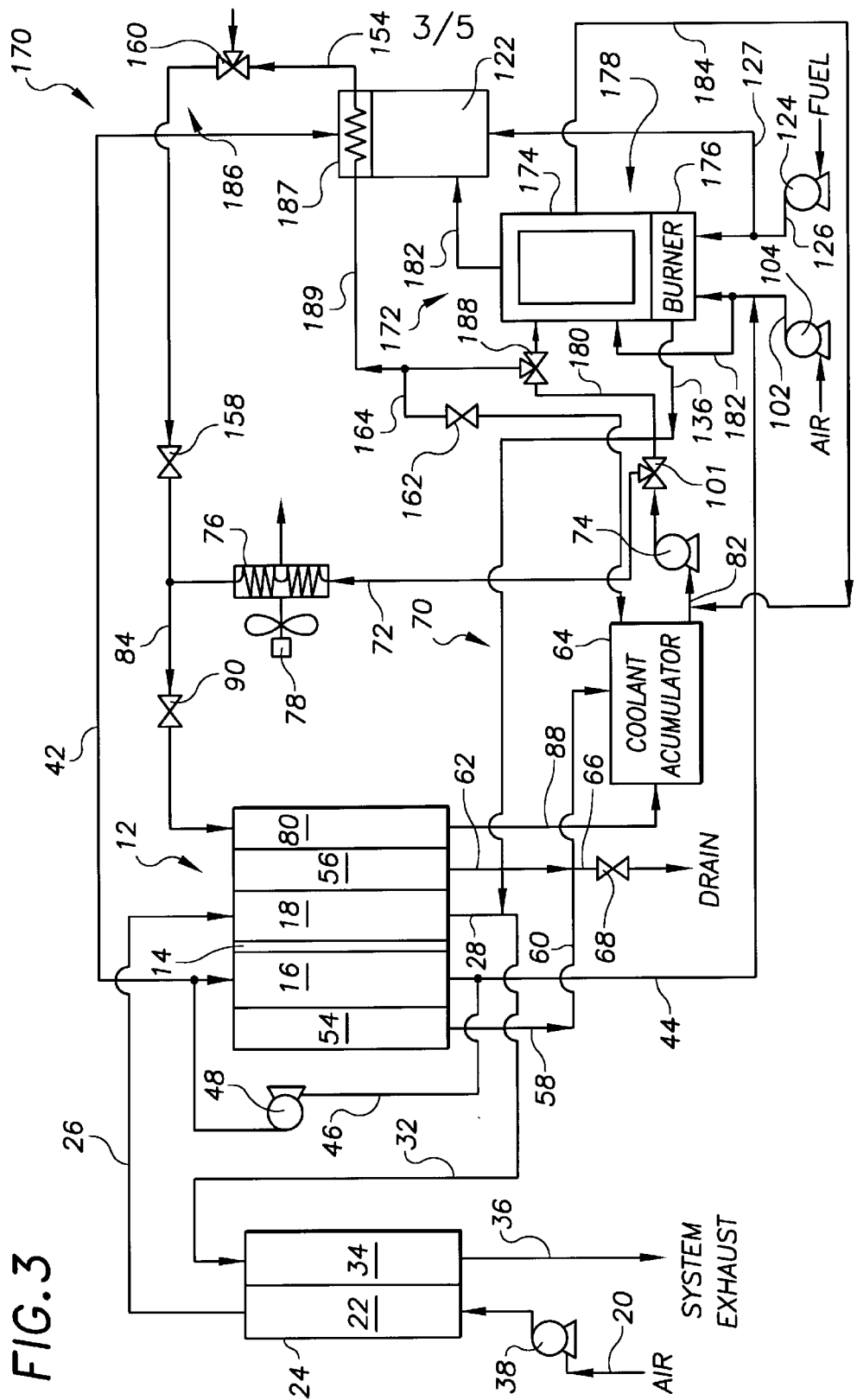
FIG. 3 is a schematic representation of a third embodiment of a fuel cell power plant having a reduced free water volume.

A third embodiment of the fuel cell power plant having a reduced free water volume is shown in FIG. 3 and is generally designated by the reference numeral 170. For purposes of efficiency, those components of the third embodiment of the fuel cell power plant 170 that are identical to the components of the first and second embodiments 10, 120 are identified with the same reference numerals in FIG. 3 as they are in FIGS. 1, 2. The third embodiment of the fuel cell power plant of the present invention 170 is very similar to the second embodiment 120, except that a third water vapor transfer system 172 utilizes a contact saturator 174 in heat exchange relationship with a second water removal burner 176 as a third water removal means 178. The contact saturator 174 receives the antifreeze coolant from a third antifreeze coolant supply line 180 secured in fluid communication with the coolant accumulator, such as at the coolant system diversion valve 101. A burner by-pass line 182 secured to the water removal air supply line 102 directs air to pass into the contact saturator 174 so that, forced by the blower 104, the air removes water vapor from the antifreeze coolant within the contact saturator 174 and the air saturated with water vapor is directed from the contact saturator 174 through a second water vapor feed line 182 into the fuel processing system 122. After the water has been removed from the antifreeze coolant within the contact saturator, the antifreeze coolant is directed back to the coolant system 70 through a second coolant system feed line 184 secured between the contact saturator 174 and a suction side of the coolant pump 174, such as at the accumulator discharge line 82.

Also in the third embodiment of the fuel cell power plant 170, a third start-up system 186 includes a third start-up valve 188 secured to a third antifreeze coolant heater line 189 that is secured in fluid communication between the coolant accumulator and a third start-up heat exchanger 187 that is in heat exchange relationship with the fuel processing system 122. As shown in FIG. 3, the third start-up valve 188 may be secured to the third antifreeze coolant feed line 180 upstream of the contact saturator 174, so that the valve 188 may selectively direct all or a portion of the antifreeze coolant to pass directly to the third start-up heat exchanger 187 for a start-up procedure, or the valve 188 may direct all or a portion of the antifreeze coolant into the contact saturator 174 for steady-state operations. As with the second embodiment 120, the third embodiment of the fuel cell power plant 170 of the present invention achieves efficiencies of operation by the integration of the third start-up heat exchanger 187 with the fuel processing system 122, and the third embodiment utilizes a non-steam producing third water vapor transfer system 172.

Figure 4:
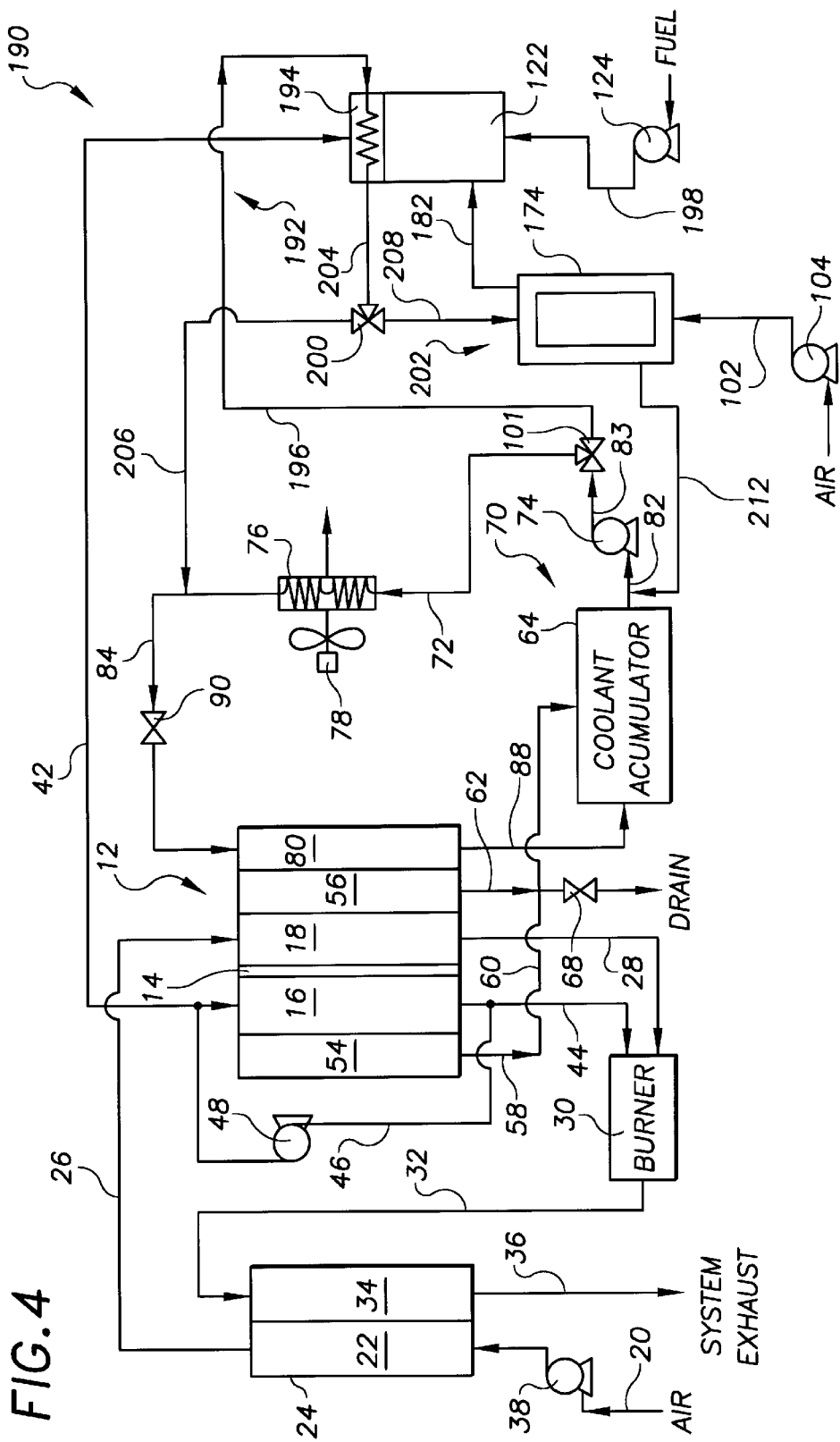
FIG. 4 is a schematic representation of a fourth embodiment of a fuel cell power plant having a reduced free water volume.

A fourth embodiment of the fuel cell power plant having a reduced free water volume is shown in FIG. 4 and is generally designated by the reference numeral 190. For purposes of efficiency, those components of the fourth embodiment of the fuel cell power plant 190 that are identical to the components of the first, second or third embodiments 10, 120, 170 are identified with the same reference numerals in FIG. 4 as they are in FIGS. 1–3. The fourth embodiment of the fuel cell power plant of the present invention 190 utilizes the burner 30 only for combustion of the anode exhaust stream, as with the first embodiment 10, and the burner 30 directs the combusted anode exhaust stream and heated cathode exhaust stream from the burner 30 into the plant exhaust line 32 through which the plant exhaust stream travels to the direct mass and heat transfer device 24. Therefore, in order to heat the antifreeze coolant for a start-up procedure, the fourth embodiment 190 includes a fourth start-up system 192 wherein a fourth start-up heat exchanger 194 that is integrated in heat exchange relationship with the fuel processing system 122, and that receives antifreeze coolant directly from the coolant accumulator 64 through a fourth antifreeze heat-up line 196 that is secured in fluid communication between the fourth start-up heat exchanger 194 and the coolant accumulator 64, such as at the coolant system diversion valve 101. In the fourth embodiment of the fuel cell power plant 190, the fuel pump 124 directs a hydrocarbon fuel through a fuel processing fuel feed line 198 to support the fuel processing system 122.

The fourth start-up system 192 also includes a fourth start-up valve 200 that is secured in fluid communication between the fourth start-up heat exchanger 194 and a fourth water vapor removal system 202 and the coolant circulating line 72. As shown in FIG. 4, a fourth start-up line 204 directs the heated antifreeze coolant from the fourth heat exchanger 194 to the fourth start-up valve 200; an extension 206 of the fourth start-up line 204 directs the heated antifreeze coolant from the fourth start-up valve 200 to the coolant circulating line 72 downstream of the coolant heat exchanger 76, for example at the cooler plate feed line 84; and, a fourth antifreeze coolant supply line 208 directs the antifreeze coolant from the fourth start-up valve 200 to the fourth water vapor transfer system 202.

The fourth water vapor transfer system 202 may include any water removal means, such as the contact saturator 174 that receives air blown by the water removal air blower 104 through the water removal air supply line 102. The air removes water vapor from the heated antifreeze passing through the contact saturator 174, and the air saturated with water vapor is directed through the second water vapor feed line 182 into the fuel processing system 122. As with the third embodiment 170, after the air has removed water vapor from the heated antifreeze within the contact saturator 174, the antifreeze coolant is directed back to the coolant system 70 through a fourth coolant system feed line 212 secured between the fourth contact saturator 174 and a suction side of the coolant pump 174, such as at the accumulator discharge line 82.

During a start-up operation of the fourth embodiment of the fuel cell power plant 190, the fourth start-up valve 200 selectively directs all or a portion of the antifreeze coolant that has passed through the fourth start-up heat exchanger 194 to flow through the extension 206 of the fourth start-up line 204 into the cooler plate feed line 84 and then into the cooler plate 80 to heat the fuel cell 12. After the fuel cell 12 has achieved a desired operating temperature, the fourth start-up valve 200 then directs the heated antifreeze coolant to flow into the fourth water vapor transfer system 202 for a steady-state operation of the fourth embodiment 190 of the fuel cell power plant having a reduced free water volume. The fourth embodiment 190 achieves efficiencies by integrating the fourth startup heat exchanger 194 with the fuel processing system 122, and by having no burner in the fourth water vapor transfer system 202.

Figure 5:
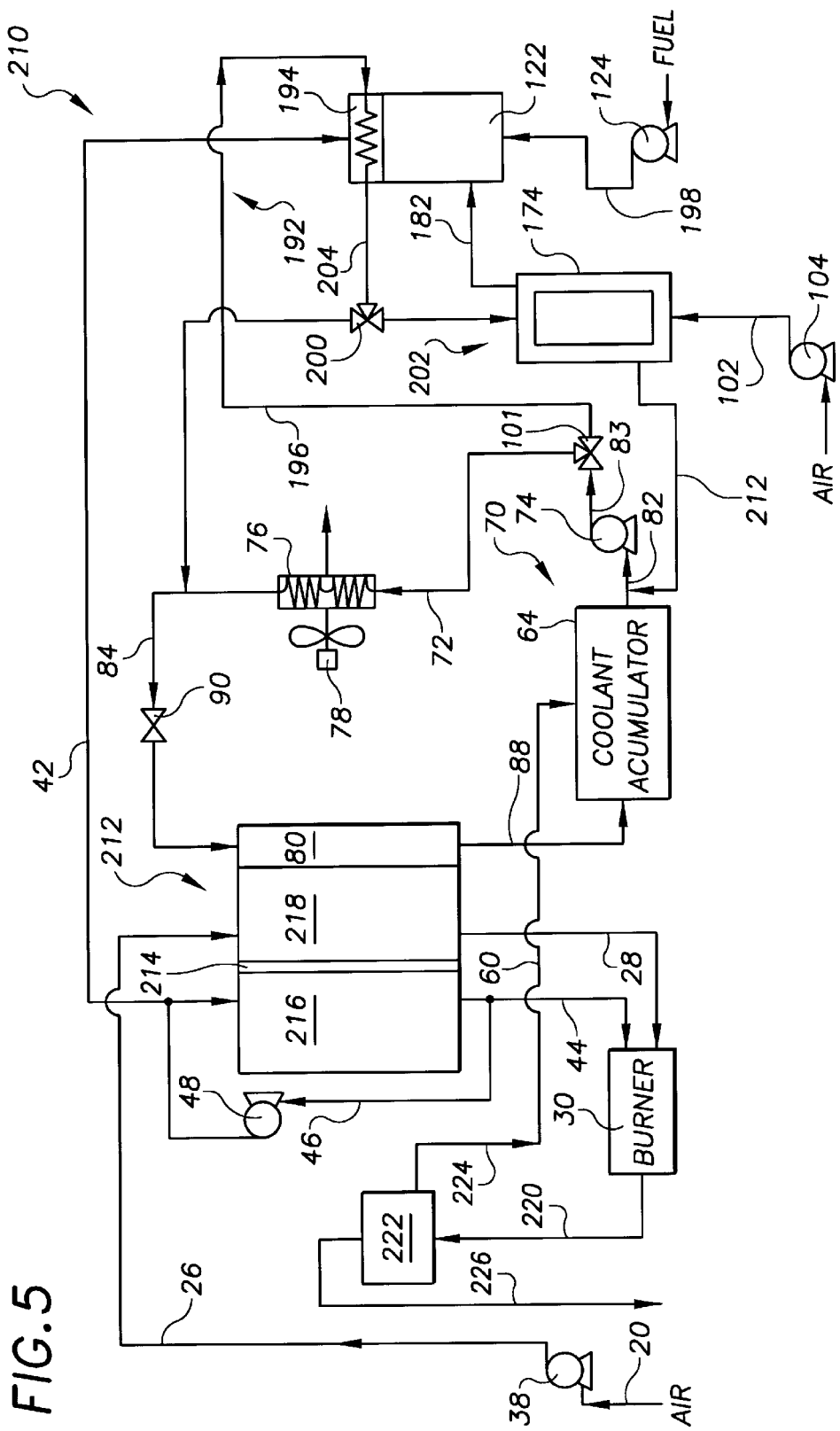
FIG. 5 is a schematic representation of a fifth embodiment of a fuel cell power plant having a reduced free water volume.

A fifth embodiment of the fuel cell power plant having a reduced free water volume is shown in FIG. 5, and is generally designated by the reference numeral 210. For purposes of efficiency, those components of the fifth embodiment of the fuel cell power plant 210 that are identical to the components of the first, second, third or fourth embodiments 10, 120, 170, 190 are identified with the same reference numerals in FIG. 5 as they are in FIGS. 1–4. The fourth embodiment of the fuel cell power plant of the present invention 210 includes a coolant system 70 that is the same as the coolant systems of the previously described embodiments, and may include any of the described water vapor transfer and start-up systems, such as the fourth water vapor transfer system 202 and the fourth start-up system 192 described above and shown schematically in FIG. 4. What primarily distinguishes the fifth embodiment 210 over the previously described embodiments is that a second fuel cell 212 is shown, wherein the first and second water flow fields 54, 56 of the previously described embodiments are not included. Instead, the second fuel cell 212 includes a second membrane electrode assembly 214 having a second anode flow field 216 and a second cathode flow field 218 on opposed sides of the membrane electrode assembly 214. The second anode flow field 216 receives a reducing fluid fuel from the reducing fluid inlet 42 and directs it to pass adjacent the second membrane electrode assembly 214, and the second cathode flow field 218 receives the process oxidant stream from the oxidant inlet 26 and directs it to pass adjacent the second membrane electrode assembly 214. The anode exhaust stream then passes from the second anode flow field 216 through the anode exhaust line 44 into the burner 30 while the cathode exhaust stream passes from the second cathode flow field 218 through the cathode exhaust line 28 into the burner 30. In this fifth embodiment of the fuel cell power plant 210, combusted anode exhaust stream and heated cathode exhaust stream exit the burner 30 as a plant exhaust stream in a second plant exhaust line 220 that directs the plant exhaust stream into a water condenser means 222 for condensing and removing water out of the plant exhaust stream, such as known air or liquid cooled condensers and gravity collectors well-know in the art. A removed water drain line 224 directs condensed water from the water condenser 222 into the fuel cell water collector 60, and the collector 60 directs the removed fuel cell water into the coolant accumulator 64. Because the water condenser 222 cools and removes water from the plant exhaust stream, the direct mass and heat transfer device 24 shown in the first, second, third and fourth embodiments 10, 120, 170, 190 would be unnecessary in most operating environments, but could be included in the fifth embodiment 210 for a specific operating requirement of the plant 210. A second system exhaust 226 directs the plant exhaust stream from the water condenser 222.

The fifth embodiment of the fuel cell power plant having a reduced free water volume 210 achieves efficiencies of the present invention for fuel cells that do not utilize one or more porous water flow fields within the cells. Because the second fuel cell 212 does not have the porous water flow fields 54, 56 adjacent to the second anode and cathode flow fields 216, 218, the water generated during operation of the second fuel cell 212, and any water within the process oxidant and reducing fluid reactant streams passes out of the second anode flow field 216 and second cathode flow field 218 as water vapor and entrained liquid droplets which are condensed or separated from the plant exhaust stream within the water condenser 222. Operation of any of the described start-up, water vapor transfer and coolant systems, such as the fourth start-up system 192, fourth water vapor transfer system 202 and the coolant system 70 would work in the fifth embodiment of the fuel cell power plant having a reduced free water volume 210.

Therefore, during shut down of the plant, the coolant system 70, start-up system 192, water vapor transfer system 202 and fuel processing system 122 have no free water that could freeze in ambient conditions below the freezing temperature of water. As described above with respect to the fourth embodiment of the fuel cell power plant 190, the fifth embodiment 210 would utilize the fourth start-up heat exchanger 194 and the fourth start-up valve 200 to direct heated antifreeze coolant into and through the sealed cooler plate 80 during a start-up operation until the second fuel cell 212 obtained a desired temperature. Then the fourth start-up valve 200 would be controlled to direct the heated antifreeze coolant from the fourth start-up heat exchanger 194 into the fourth water vapor transfer system 202 during steady-state operation of the fifth embodiment of the fuel cell power plant 210.

During steady-state operation, the water collector may also discharge directly to the fuel processing system 121, as is known. Alternatively, the water collector may discharge to a fuel processing feedwater pump (not shown) which provides water to the fuel processing system as is known thus by-passing the water vapor transfer systems 121, 172 and 202. The fuel processing feedwater pump may also be configured so that it will drain into the coolant accumulator 64 upon being shutdown.

While the present invention has been described and illustrated with respect to the above five embodiments of the fuel cell power plant having a reduced free water volume 10, 120, 170, 190, 210, it is to be understood that the invention is not to be limited to the described and illustrated embodiments. For example, the five embodiments of the fuel cell power plant 10, 120, 170, 190, 210 are described above as applying primarily to fuel cells 12, 212 including a proton exchange membrane ("PEM") electrolyte assembly 14, 214. However, embodiments of the fuel cell power plant having a reduced free water volume 10 may also be applied to a fuel cell having alternative electrolytes. Accordingly, reference should be made primarily to the following claims rather than the foregoing description to determine the scope of the invention.

What is claimed is:

1. A fuel cell power plant having a reduced free water volume, the plant comprising:
   a. at least one fuel cell for generating electrical current from reducing fluid and process oxidant reactant streams;
   b. a coolant system including a sealed cooler plate secured in heat exchange relationship with the fuel cell that directs an antifreeze coolant through the cooler plate, a coolant accumulator in fluid communication with the cooler plate that stores the antifreeze coolant, and a coolant circulating line that directs the antifreeze coolant to flow from the coolant accumulator, through a coolant heat exchanger, through the cooler plate and back to the coolant accumulator;
   c. a fuel cell water collector in fluid communication between the fuel cell and the coolant system that directs water from the fuel cell to the coolant system;
   d. a water vapor transfer system secured in fluid communication with the coolant accumulator that receives the antifreeze coolant from the accumulator and transfers water vapor out of the coolant antifreeze; and,
   e. a fuel cell start-up system secured in fluid communication with the coolant accumulator and with the fuel cell including a start-up heat exchanger that heats the antifreeze coolant, wherein the heated antifreeze coolant is selectively directed from the start-up heat exchanger through the sealed cooler plate to heat the fuel cell.

2. The fuel cell power plant having a reduced free water volume of claim 1, wherein the start-up heat exchanger is secured in heat exchange relationship with a burner that receives and combusts an anode exhaust stream directed from the fuel cell to the burner within an anode exhaust line.

3. The fuel cell power plant having a reduced free water volume of claim 2, wherein the heated antifreeze coolant is in fluid communication with the water vapor transfer system.

4. The fuel cell power plant having a reduced free water volume of claim 1, further comprising a fuel processing system for processing a hydrocarbon fuel into the reducing fluid, wherein the fuel processing system is secured in fluid communication with the water vapor transfer system and receives the water vapor transferred out of the antifreeze coolant.

5. The fuel cell power plant having a reduced free water volume of claim 1, wherein the fuel cell includes at least one water transport plate secured in fluid communication with the fuel cell water collector so that water removed from the fuel cell is directed through the water transport plate into the fuel cell water collector.

6. The fuel cell power plant having a reduced free water volume of claim 1, further comprising a pressure control means for regulating a pressure of the antifreeze coolant within the sealed cooler plate, so that the pressure of the antifreeze coolant passing through the sealed cooler plate is less than a pressure of the reducing fluid and process oxidant reactant streams passing through the fuel cell.

7. The fuel cell power plant having a reduced free water volume of claim 1, wherein the water vapor transfer system includes a water removal burner secured in heat exchange relationship with a boiler secured in fluid communication with the coolant system, and a steam separator secured in fluid communication with the boiler for separating the water vapor as steam and for removing the water vapor from the water vapor transfer system.

8. The fuel cell power plant having a reduced free water volume of claim 7, wherein an anode exhaust line feeds an anode exhaust stream to the water removal burner.

9. The fuel cell power plant having a reduced free water volume of claim 1, wherein the water vapor transfer system includes a contact saturator secured in fluid communication with the coolant system that receives the antifreeze coolant, and that receives air so that the air removes water vapor from the antifreeze coolant.

10. The fuel cell power plant having a reduced free water volume of claim 9, wherein a water removal burner is in fluid communication with the contact saturator, and wherein an anode exhaust line feeds an anode exhaust stream to the water removal burner.

11. The fuel cell power plant having a reduced free water volume of claim 1, wherein the antifreeze coolant is selected from the group consisting of an alkanetriol solution and polyethylene glycol and mixtures thereof.

12. The fuel cell power plant having a reduced free water volume of claim 1, wherein the antifreeze coolant is selected from the group consisting of glycerol, butanetriol, pentanetriol, polyethylene glycol, and mixtures thereof.

13. The fuel cell power plant having a reduced free water volume of claim 1, wherein a burner is secured in fluid communication with an anode exhaust stream leaving the fuel cell, and a water condenser means for condensing and removing water is secured in fluid communication with and receives a combusted anode exhaust stream leaving the burner and receives a cathode exhaust stream leaving the fuel cell, and a removed water drain line secured in fluid communication with the water condenser means and the coolant system directs water from the condenser to the coolant system.

14. The fuel cell power plant having a reduced free water volume of claim 1, wherein a burner is secured in fluid communication with an anode exhaust stream leaving the fuel cell, and a direct mass and heat transfer device is secured in fluid communication with and receives a combusted anode exhaust stream leaving the burner and receives a cathode exhaust stream leaving the fuel cell, and receives a process oxidant stream entering the fuel cell within an oxidant inlet, so that the direct mass and transfer device transfers mass and heat from the combusted anode exhaust and cathode exhaust streams into the process oxidant stream entering the fuel cell.

15. The fuel cell power plant having a reduced free water volume of claim 1, wherein the fuel cell start-up system includes a start-up valve secured in fluid communication with the water vapor transfer system and with a start-up line secured in fluid communication between the start-up heat exchanger and the coolant system, so that the start-up valve selectively directs the heated antifreeze coolant from the start-up heat exchanger through the sealed cooler plate to heat the fuel cell.

16. A fuel cell power plant having a reduced free water volume, the plant comprising:
   a. at least one fuel cell for generating electrical current from reducing fluid and process oxidant reactant streams;
   b. a coolant system including a sealed cooler plate secured in heat exchange relationship with the fuel cell that directs an antifreeze coolant through the cooler plate, a coolant accumulator in fluid communication with the cooler plate, and a coolant circulating line that directs the antifreeze coolant to flow from the coolant accumulator, through a coolant heat exchanger, through the cooler plate and back to the coolant accumulator;
   c. a fuel cell water collector in fluid communication between the fuel cell and the coolant system that directs some water from the fuel cell to the coolant system;
   d. a water vapor transfer system secured in fluid communication with the coolant accumulator that receives the antifreeze coolant from the accumulator and transfers water vapor out of the coolant antifreeze;
   e. a fuel processing system for processing a hydrocarbon fuel into the reducing fluid, wherein the fuel processing system is secured in fluid communication with the fuel cell water collector and with the water vapor transfer system and receives water vapor transferred out of the coolant antifreeze; and,
   f. a fuel cell start-up system secured in fluid communication with the coolant system and with the fuel cell including a start-up heat exchanger that heats the antifreeze coolant, wherein the heated antifreeze coolant from the start-up heat exchanger is selectively directed through the coolant system to heat the fuel cell.

17. The fuel cell power plant having a reduced free water volume of claim 16, wherein the water vapor transfer system includes a contact saturator that receives air so that the air removes water vapor from the antifreeze coolant.

18. The fuel cell power plant having a reduced free water volume of claim 16, wherein the antifreeze coolant is selected from the group consisting of glycerol, butanetriol, pentanetriol, polyethylene glycol, and mixtures thereof.

19. A method of operating a fuel cell power plant having a reduced free water volume, comprising the steps of:
   a. circulating an antifreeze coolant from a coolant accumulator, through a coolant heat exchanger, through a sealed cooler plate secured in heat exchange relationship with a fuel cell of the power plant, and back into the coolant accumulator;
   b. directing water produced by and passing through the fuel cell into the coolant accumulator;
   c. circulating a portion of the coolant antifreeze from the coolant accumulator through a water vapor removal system so that water vapor is removed from the antifreeze coolant, and then circulating the antifreeze coolant back to the coolant system; and,
   d. heating a portion of the antifreeze coolant within a start-up heat exchanger and selectively directing the heated antifreeze coolant to pass through the sealed cooler plate to heat the fuel cell.

20. The method of operating a fuel cell power plant having a reduced free water volume of claim 19, comprising the further steps of directing the water removed from the antifreeze coolant into a fuel processing system to support processing of a hydrocarbon fuel into a reducing fluid for the fuel cell.

21. The method of operating a fuel cell power plant having a reduced free water volume of claim 20, comprising the further step of directing water from the fuel cell water collector to the fuel processing system.

22. The method of operating a fuel cell power plant having a reduced free water volume of claim 21, comprising the further steps of pumping water through a fuel processing feedwater pump from the fuel cell water collector to the fuel processing system, and draining water through the fuel processing feedwater pump into the coolant accumulator whenever the fuel cell power plant is shut down.

23. The method of operating a fuel cell power plant having a reduced free water volume of claim 19, comprising the further steps of securing the start-up heat exchanger in fluid communication with a contact saturator of the water removal system, and directing heated antifreeze coolant from the start-up heat exchanger through the contact saturator.

* * * * *